United States Patent

Cotton

[11] Patent Number: 5,090,488
[45] Date of Patent: Feb. 25, 1992

[54] POWER TOOL

[75] Inventor: Lawrence M. Cotton, New Bern, N.C.

[73] Assignee: Robert Bosch Power Tool Corporation, New Bern, N.C.

[21] Appl. No.: 564,536

[22] Filed: Aug. 7, 1990

[51] Int. Cl.$^5$ .................................................. B23B 45/02
[52] U.S. Cl. ........................................ 173/163; 310/50; 408/226
[58] Field of Search ................. 173/163; 310/50; 274/78, 89, 1 B, 1 E, 1 A; 408/239 A, 226

[56] References Cited

U.S. PATENT DOCUMENTS

| | | | |
|---|---|---|---|
| 3,344,690 | 10/1967 | Proska | 408/226 |
| 3,368,090 | 2/1968 | Miller | 310/50 |
| 3,652,879 | 3/1972 | Plunkett et al. | 310/50 |
| 4,835,410 | 5/1989 | Bhagwat et al. | 307/64 |
| 4,930,583 | 6/1990 | Fushiya et al. | 173/109 |
| 4,941,783 | 7/1990 | Maier | 408/204 |
| 4,995,768 | 2/1991 | Craft | 408/239 A |

FOREIGN PATENT DOCUMENTS 2414464 10/1975 Fed. Rep. of Germany ...... 408/226

Primary Examiner—Frank T. Yost
Assistant Examiner—John M. Husar
Attorney, Agent, or Firm—Michael J. Striker

[57] ABSTRACT

A power tool comprises a chuck, a first shaft driving the chuck and having an axis, a driving motor, a second shaft extending from the driving motor substantially parallel to the first shaft, means for transmitting a rotation of the second shaft to the first shaft and including a single belt connecting the shafts with one another, and a housing surrounding the shafts. The housing has a top surface which is spaced from the axis of the first shaft by a distance which is at most equal to a distance between the axis of the first shaft and a top surface of the chuck.

7 Claims, 2 Drawing Sheets

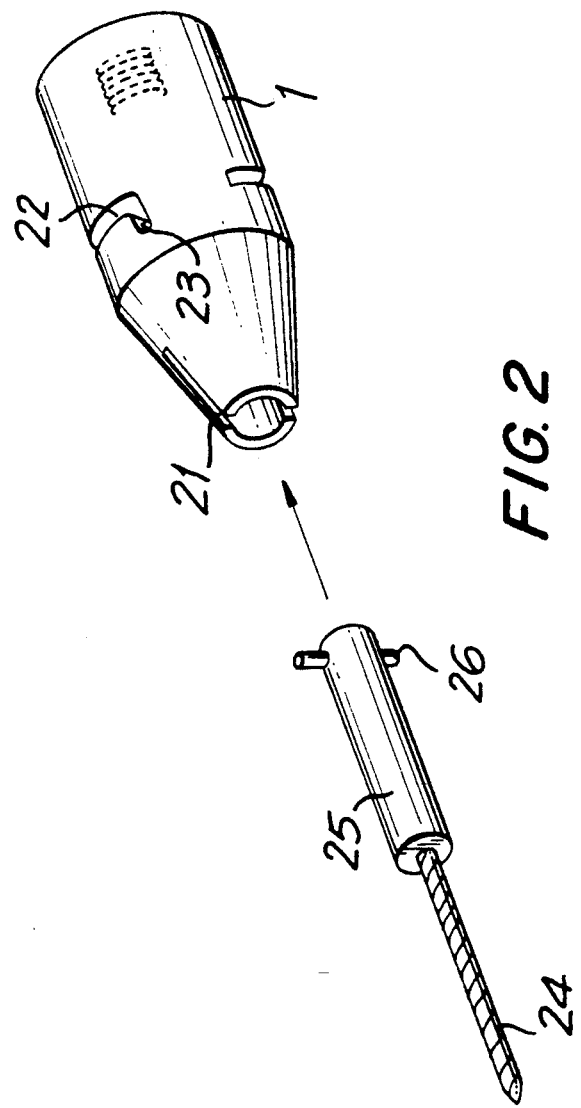

POWER TOOL

BACKGROUND OF THE INVENTION

The present invention relates generally to power tools, and more particularly to a drilling tool or a drilling and driving tool.

Power tools of the above mentioned general type are known in the art. One of the main requirements for such a power tool is to design it so that the tool itself held in the power tool can be located as close as possible to an outer contour of the power tool housing to allow drilling or driving in limited clearance areas. In known power tools of this type the motor is conventionally arranged immediately behind a chuck sometimes with a clutch therebetween. In this construction the outer diameter of the motor and/or the clutch determines the diameter of the housing which accommodates the same. A power tool is also known in which a motor is located on a separate shaft and faces rearwardly, and the transmission is performed through toothed gears which determine the diameter of the housing. In both cases the diameter of the housing is quite substantial, and the outer contour of the housing projects radially beyond the outer contour of the chuck, thus limiting manipulations with the power tool in narrow clearance spaces.

SUMMARY OF THE INVENTION

Accordingly, it is an object of the present invention to provide a power tool of the above mentioned general type, which avoids the disadvantages of the prior art.

More particularly, it is an object of the present invention to provide such a power tool in which a distance between the axis of the chuck or the axis of the tool to the outer contour of the power tool is as small as possible and the overall size of the tool is smaller than in conventional tools.

In keeping with these objects and with others which will become apparent hereinafter, one feature of the present invention resides, briefly stated, in a power tool which has a chuck for holding a tool, a shaft for mounting the chuck, a motor, a second shaft extending parallel to the first mentioned shaft from said motor, and a belt drive connecting the two shafts with one another without intermediate shafts, wherein a radial distance of an outer surface of the housing from the axis of the chuck shaft is at most equal to the radial distance from this axis and the outer surface of the chuck.

When the power tool is designed in accordance with the present invention, it eliminates the disadvantages of the prior art and provides for the highly advantageous results, including a small size of the tool and its maneuverability in low clearance spaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is an exploded view showing a connection of a tool and a chuck of the inventive power tool.

DESCRIPTION OF THE PREFERRED EMBODIMENTS

Figure 1:
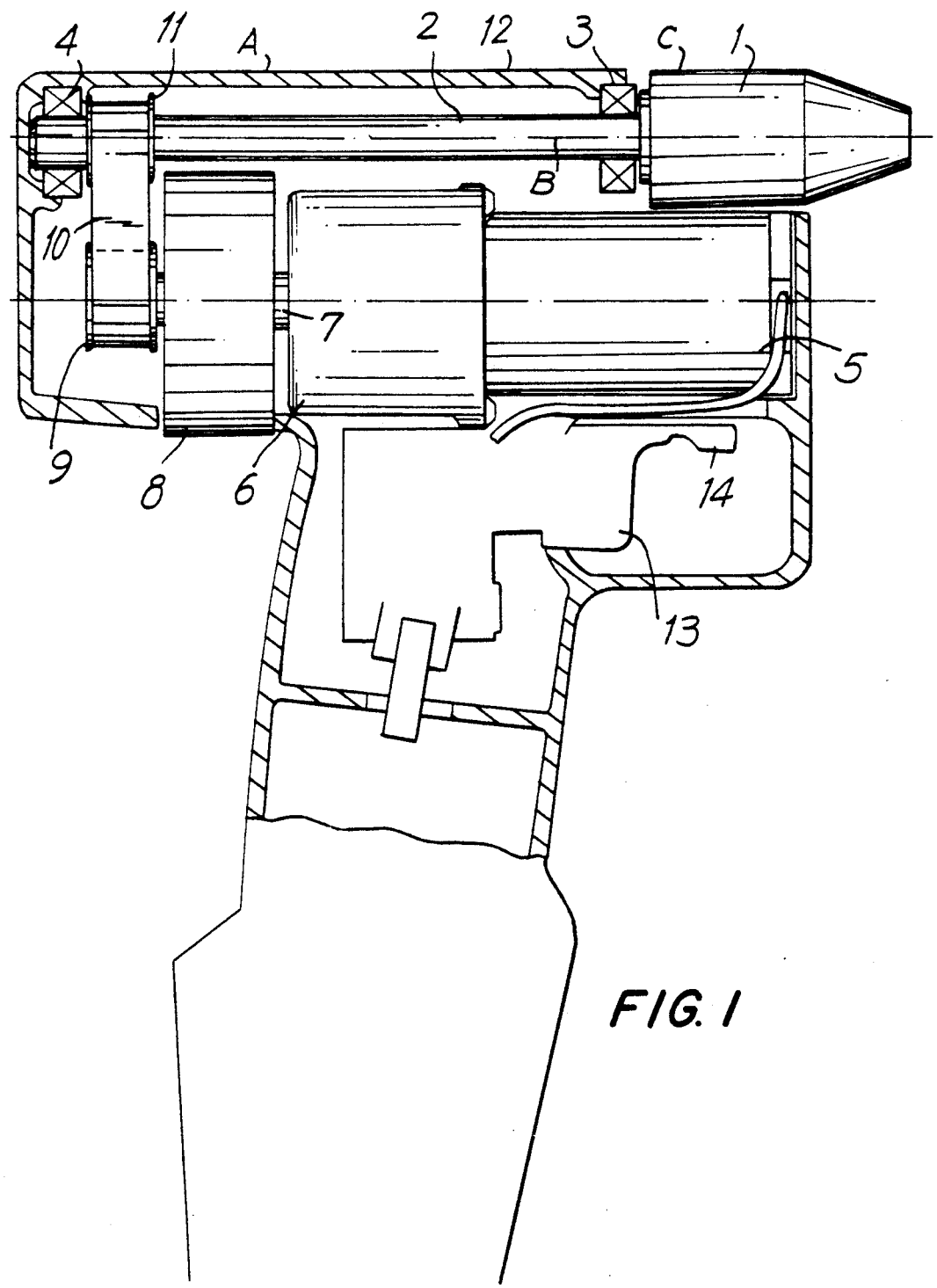
FIG. 1 is a schematic view showing a power tool in accordance with the present invention.

A power tool in accordance with the present invention, formed for example as a power drill, includes a chuck which is identified with reference numeral 1 and has a conventional construction for holding a tool in it. The chuck 1 is connected with a shaft 2 extending rearwardly from the chuck and supported in front and rear bearings 3 and 4 respectively. The chuck is driven from a drive motor 5 through a planetary gear 6. A drive shaft extending from the motor 5 is identified with reference numeral 7 and is connected with a clutch 8. More particularly, as is conventional, one part of the shaft 7 mounts one portion of the clutch, while the other portion of the clutch is mounted on the other part of the shaft 7. The other part of the shaft 7 carries a pulley 9 which is connected by a belt 10 with another pulley 11. The latter is mounted on the shaft 2. The belt 10 and pulleys 9, 11 can be formed with interengaging teeth. Preferably, for simplification of the construction, the pulleys 9 and 11 have the same diameters.

The power tool further has a housing identified with reference numeral 12. The upper surface a of the housing 12 is radially spaced from an axis b of the shaft 2 by a distance which is at most equal to a distance between an outer surface c of the chuck 1 and the axis b. Thus, the outer surface c of the chuck determines the uppermost extension of the tool. This insures maneuverability of the tool in the low clearance spaces since neither the housing, nor the clutch, nor the motor determine the radial outer extension of the power tool as a whole. Also, since the shaft 7 and shaft 2 are connected by a belt drive without any intermediate shafts or gears, the distance between the shafts 2 and 7 is very small, which further contributes to the overall small size of the power tool and allows its easier maneuverability.

The tool is operated in a known manner. By actuating a trigger 13, the battery supplies electric current to the motor 5 which drives the chuck respectively. As well known, a reversing lever 14, by pushing it in a plane perpendicular to the plane of the drawings, can change the polarity and therefore reverse the direction of rotation of the motor. The clutch is turnable about its axis, so as to adjust the rotary speed of the chuck, as also well known in the art.

The chuck 1 is provided with a front slot 21, a transverse slot 22 and a short longitudinal slot 23. A tool such as for example a drill bit 24 has a shank 25 provided with a pin 26. The pin 26 is dimensioned so that during insertion of the tool into the chuck it passes through the front slot 21 and then engages in a transverse slot 22. The chuck has two such slots 23 at both ends of the transverse slot 22.

The longitudinal slots 23 provide for highly advantageous results. If a drill has been moving forward and drilling into a workpiece and then jams for some reason, the user will attempt to withdraw it by pulling backwards and running the drill. Depending on the user he will run the drill either forward or reverse. When he pulls backwards the pins 26 will immediately move into the slot 23 and will not be able to traverse across the slot 22. If the user leaves the drill in the forward-running direction while pulling backwards, there is no potential problem. However, in the conventional tools if the user puts the drill into reverse while pulling backwards on the drill, the pins 26 would have a tendency to traverse the slot 22 to reach its other end 90° away. The traversing of the slot 22 is potentially dangerous because the pins would have to pass across interior opening of the slot 21 before the reaching the opposite end of the slot 22. When the pins intersect the interior opening of the slot 21, they could enter that opening, and as a result the tool could be released by the chuck. If the user for example were on a ladder, he could the fall backwards.

In accordance with the present invention the slots 23 prevent the pins from going anyway when the user pulls back on the drill. Thus, the above mentioned danger is completely eliminated.

It will be understood that each of the elements described above, or two or more together, may also find a useful application in other types of constructions differing from the types described above.

While the invention has been illustrated and described as embodied in a power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A power tool, comprising a chuck; a first shaft driving said chuck and having an axis; a driving motor; a second shaft extending from said driving motor substantially parallel to said first shaft; means for transmitting a rotation of said second shaft to said first shaft and including a single belt connecting said shafts with one another; and a housing surrounding said shafts, said housing having a top surface which is spaced from said axis of said first shaft by a distance which is at most equal to a distance between said axis of said first shaft and a top surface of said chuck.

2. A power tool as defined in claim 1, wherein each of said shafts carries a pulley, said belt being arranged on said pulleys.

3. A power tool as defined in claim 2, wherein said pulleys have identical diameters.

4. A power tool as defined in claim 1, wherein said shafts have forward ends and rearward ends, said chuck being mounted on said forward end of said first shaft and said motor being mounted on said forward end of said second shaft, said belt being provided on said rearward ends of said shafts.

5. A power tool as defined in claim 1; and further comprising a tool inserted in said chuck, said tool having a rear end provided with a transverse pin, said chuck having a front end with a longitudinal slot and a body provided with a transverse slot and two longitudinal slots at both ends of said transverse slot so that when the power tool is driven into reverse and pulled backwards, said pin engages into one one of said longitudinal slots at the end of said transverse slot and said tool cannot be withdrawn from said chuck.

6. A power tool, comprising a chuck; a driving motor; means for transmitting a rotation of said driving motor to said chuck and consisting of a first shaft having a front end connected with and driving said chuck and also having a rear end, a second shaft extending parallel to said first shaft from said driving motor and having a front end connected with and rotatable by said driving motor and also having a rear end, and a single belt arranged around and connecting said rear ends of said shafts with one another; and a housing surrounding said shafts.

7. A power tool, comprising a chuck; a first shaft driving said chuck and having an axis; a driving motor; a second shaft extending from said driving motor substantially parallel to said first shaft; means for transmitting a rotation of said second shaft to said first shaft; a housing surrounding said shaft; a tool inserted in said chuck; and means for preventing an accidental withdrawal of said tool from said chuck and including a rear end at said tool provided with a transverse pin, and a front end of said chuck, provided with a long longitudinal slot and a body of said chuck with an intersecting transverse slot and two short longitudinal slots at both ends of said transverse slot so that when the power tool is driven into reverse while being pulled rearwardly, said pin said short longitudinal slots preventing a withdrawal of said tool from said chuck and preventing said pin from transversing said transverse slot thus encountering said long longitudinal slot and not allowing said tool to be accidentally withdrawn from said chuck.

* * * * *